United States Patent Office 3,235,446
Patented Feb. 15, 1966

3,235,446
IODINATED POLYURETHANE FOAMS
AND FILMS
Morris V. Shelanski, Gulph Mills, and Theodore Levenson, Wyndmoor, Pa., assignors to Industrial Biology Laboratories, Inc., Philadelphia, Pa., a corporation of Pennsylvania
No Drawing. Filed July 12, 1961, Ser. No. 123,441
21 Claims. (Cl. 167—17)

This invention relates to iodinated polyurethane foams and films and constitutes a continuation-in-part of our copending application, Serial No. 763,467, filed September 26, 1958, now issued as United States Patent No. 3,098,048, dated July 16, 1963.

We have discovered that a polyurethane foam or film, which is made by reacting a polyester or polyether containing terminal hydroxyl groups with di-isocyanates, removes substantial amounts of iodine from solutions thereof and combines with the iodine in such a manner that, when dry, it releases in water equilibrium or controlled amounts of iodine considerably less than the amounts which had originally combined with the foam or film thereby rendering the iodinated foam or film a reservoir for the release of controlled amounts of iodine. The films herein described are capable of slowly releasing equilibrium amounts of iodine when the film is exposed to water vapor.

We have also discovered that when the foam or film is of the type described in our copending application referred to above, namely, one which is made by reacting with a di-isocyanate a surfactant containing a hydrophilic portion having at least two chains formed solely of ethylene oxide and each chain terminating in an hydroxyl group and the final product has an ethylene oxide content of 30 to 80% by weight, it complexes with iodine and subsequently when dry, releases in water not only equilibrium or controlled amounts of iodine but also controlled amounts of the surfactant or detergent thereby forming complexes of the iodine and detergent in the water extract. This extract thereby combines both cleaning and antiseptic properties, the latter being enhanced by the surfactant as is the case with detergent, water soluble idophors. Foams and films of the foregoing type in which the final product contains less than 30% by weight of ethylene oxide also form useful complexes with iodine.

As is well known, elemental iodine is an excellent germicide because of its very rapid rate and wide spectrum of kill. Because the iodinated products of the instant invention release iodine in water in the order of magnitude of 10–40 p.p.m., a concentration ample for rapid kill of bacteria, and because the products are foams or films, they have unique utility. Thus, the films, being antiseptic, are capable of use as self adhesive sterile bandages. The iodinated foams are useful as Tampons for feminine hygiene, as antiseptic household sponges and as a means to sterilize surgical instruments by dropping them onto a bed of the foam underneath water. In hospitals and other establishments requiring disinfected air, the air can be readily disinfected by filtering it through the moistened iodinated foam in an air conditioning unit. Industrially, the iodinated sponges have many uses, as for example in the sterilization of water by passing it through a column of ground iodinated foam.

The process of producing the iodinated foam comprises first making the foam, then treating it with iodine by simply squeezing the foam repeatedly and for a relatively short time in a water-methanol solution of iodine, preferably a 0.4% iodine solution using equal volumes of water and methanol, and finally drying the foam. In the case of films, they are iodinated by exposing them to iodine vapors.

The iodinated products of the instant invention acquire the characteristic amber iodine color but are virtually free of odor when dry, because of the low vapor pressure of the iodine when it is complexed in the product. The extent to which the products of the invention will complex with iodine and release iodine in controlled amounts in water as well as their stability is dependent upon the composition of the foams and films themselves. Thus, it has been found, for example, that the expansible detergent polyurethane foams, i.e., those made from a surfactant containing a hydrophilic portion having at least two ethylene oxide chains and terminal hydroxyl groups and in which the final product has an ethylene oxide content of at least 30%, are capable of complexing as much as 30% by weight of iodine and of releasing iodine in water in the order of magnitude of 30–40 p.p.m. A polyesterurethane foam, on the other hand, while combining well with iodine retains approximately one-half the maximum iodine retained by the expansible detergent foams and releases iodine in water in the order of magnitude of 10–20 p.p.m. The iodinated expansible detergent foams are also more stable than the iodinated polyether or polyester urethane foams. Moreover, we have also discovered that iodinated foams containing less than 30% of ethylene oxide, although lacking in expansibility, are nevertheless superior as iodinated products to the polyether and polyester iodinated foams.

The reaction between polyfunctional hydroxyl terminated polyethers and polyesters with polyfunctional organic di-isocyanates and subsequently with water to produce polyurethane foams is well known in the art and needs no elaboration. See the starting materials used and reactions described, for example, in Patent Nos. 2,920,983; 2,927,905; and 2,948,691. Non-limitative examples of conventional polyether and polyester foams containing less than 30% ethylene oxide and the manner in which they were iodinated are as follows:

*Example I*

10 parts by weight of a commercial polyester (such as Paraplex U–148, a glycol adipic acid polyester made by Rohm & Haas Co., Multron made by Mobay Chemical Co., or Formrez No. 50, a glycol-adipate type polyester made by Witco Chemical Co.) is stirred at 100° C. for two hours with 45 parts by weight of tolylene di-isocyanate (Nacconate 80, see infra). 2 parts by weight of N-methyl morphine, 1 part by weight of an emulsifying agent (such as Witco H–77, a blend of polyalcohol carboxylic acid esters and sulfonated oils made by Witco Chemical Co.) and 3 parts by weight of water are mixed and added with thorough stirring to the polymer di-isocyanate mixture. After one hour at room temperature, the foam is cured overnight at 70° C.

A 2 g. sample of the foam is iodinated by immersing it in 100 ml. of an aqueous-alcoholic iodine solution and alternately squeezing and releasing it for one minute. The iodine solution is made by dissolving 4 gms. iodine in 500 ml. methanol and then adding 500 ml. water and using 100 ml. portions for the immersion of the foam therein. The foam upon immediate analysis contains 6.5% iodine based on its original weight. It is then dried overnight at room temperature.

*Example II*

100 parts by weight of polyoxypropylene glycol (about M.W. 1,000) and 23 parts by weight of tolylene di-isocyanate (Nacconate 80) are mixed for six minutes, heated for forty-five minutes at 90° C. and left at that temperature for eight hours. 19 parts by weight of Nacconate 80 are then added and the mixture cooled to room temperature to form the prepolymer. 100 parts by weight of the prepolymer, 0.5 part silicone oil, 10 parts emulsifier (such as Flexol 10–10 (didecyl phthalate) made by Union Carbide), 1 part N-methylmorpholine, 0.3 part triethyl amine and 2.25 parts water are mixed and after one hour at room temperature, the foam is cured at 125° C. for three hours followed by allowing it to remain for about 72 hours at room temperature.

The foam is iodinated by the same procedure specified in Example I.

The foams having built-in detergency and great expansibility are made with a starting material which is a surfactant having a hydrophiobic portion, such as propylene oxide polymer, ethylene diamine to which propylene oxide has been added, alkyl phosphate, alkyl amide, dicarboxy fatty acid alkyl, dihydroxy fatty acid alkyl, and a hydrophilic portion consisting of an ethylene oxide chain attached to each of the functional groups of the hydrophobic portion so that the final foamed product has an ethylene oxide content of 30 to 80% by weight. Examples of the starting material are certain of the Ethomids, made by Armour Company and certain of the Pluronics and Tetronics made by Wyandotte Chemicals Corp. The Ethomids are non-ionic surfactants produced by reacting fatty acid amides having 12 to 18 carbon atoms with ethylene oxide in which about 5 to 50 moles of ethylene oxide per mole of fatty acid amide are employed. In the instant invention up to 100 moles of ethylene oxide per mole of fatty acid amide may be used. The Ethomids are described in a booklet entitled "Armour Etho Chemicals," published by Armour Chemical Division of Armour and Company, copyrighted 1955. Ethomid HT/60 is a surfactant produced by reacting a mole of hydrogenated tallow amide with 50 moles of ethylene oxide. Its average molecular weight is 2478. The Pluronics are a series of high molecular weight, nonionic surfactants prepared by condensing ethylene oxide with a hydrophobic base formed by the condensation of propylene oxide and propylene glycol. The Pluronics which are used in the instant invention are made by condensing ethylene oxide with a hydrophobic base made from a polymer of propylene oxide. The hydrophobic base used as examples has a molecular weight of 1500–1800. The ethylene oxide portion must then be at least 40% by weight. The Pluronics are described in a brochure entitled "Presenting the Pluronic Grid" published by the Wyandotte Chemical Co. (Form No. 499–MULCO–140M.)

Similarly, if the hydrophobic base has a lower molecular weight, then the ethylene oxide content will have to be higher initially in order to obtain at least 30% by weight of ethylene oxide in the final product. If the hydrophobic base has a higher molecular weight, then the ethylene oxide content may be slightly lower in order to obtain 30% by weight of ethylene oxide in the final product.

The Tetronics are similar to the Pluronics except the initial material is ethylene diamine instead of propylene glycol.

Regarding the di-isocyanates which react with the aforementioned surfactants, we have found that our best foams and films may be made with the Nacconates, products of Allied Chemical & Dye Corp. The commercially available Nacconates (similar materials are produced by the Du Pont Company under the trade name Hylenes) may be essentially pure compounds or mixtures of position isomers. They may be liquids or solids. Nacconate 100 is a pure 2,4-tolylene di-isocyanate. Nacconate 80 is a mixture containing 80% of the 2,4-compound and 20% of the 2,6-compound Nacconate 65 is a mixture containing 65% of the 2,4-compound and 35% of the 2,6-compound. The best foams are made from mixtures of isomers. An unusually strong, high density foam results from the use of Nacconate 200 which is 3,3'-bitolylene-4,4'-di-isocyanate.

The following are illustrative, but non-limitative examples of iodinated expansible and non-expansible foams with built-in detergency and methods of making them.

*Example III*

115 g. of Ethomid HT/60 (50 moles of ethylene oxide) and 8.28 ml. of Nacconate 80 (80% of 2,4 isomer, 20% of 2,6 isomer) are mixed and allowed to react at approximately 110° C. for about one hour, after which the reaction mixture is cooled to about 60° C. 27.6 ml. of Nacconate 80 and 18.4 ml. of dimethyl formamide and 18.4 ml. of Ethomid HT/60 are then added to the reaction mixture to form the prepolymer. A small amount of water is intimately admixed with the prepolymer and the foam is allowed to grow, preferably in a mold of desired size and shape at 70° C. and then cured overnight in a 70° C. oven.

The foam is iodinated in the same manner as that specified in Example I.

*Example IV*

The process of Example III is carried out except that Nacconate 65 (65% of the 2,4 isomer and 35% of the 2,6 isomer) is used instead of Nacconate 80.

*Example V*

The process of Example III is carried out except that to the Ethomid HT/60 is added, in 10% by weight, a quaternary ammonium iodide formed from Ethomeen 18/25, a tertiary amine made by Armour Company having the structure:

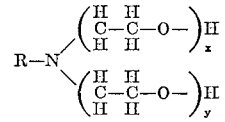

wherein $R=C_{18}H_{37}$ and $x+y=15$ and methyl iodide.

This foam is partially cationic in character which, when used to soak up a surface active agent such as Ultrawet K (a sodium alkyl aryl sulfonate, an anionic deteregnt made by Atlantic Refining Company) will release large quantities of suds repeatedly over an extended period of time. It is to be understood that the quaternary ammonium compound may be a halide other than the iodide having the same structure as specified hereinabove with R being a fatty acid alkyl radical of $C_{12}$ to $C_{18}$ and $x+y=$ about 5 to 100.

*Example VI*

To 50 g. of dry Pluronic F68 (80% ethylene oxide) is added 2 ml. Nacconate 80, and the mixture is stirred for about two hours at approximately 120° C. in a system open via a capillary. An additional 12 ml. of Nacconate 80 is added and then cooled to room temperature to form a solid prepolymer. To 25 g. of the melted prepolymer is added 0.895 ml. of a catalyst mixture comprised of 10 g. N-methyl morpholine, 2 g. triethylamine, 3 g. Pluronic L–62 (20% ethylene oxide) and 36 g. H₂O, with constant stirring, and the foam is allowed to stand at room temperature for one hour. It is then cured by drying at 70° C. for approximately twenty-four hours.

The foam is iodinated in the same manner as that specified in Example I.

*Example VII*

To 50 g. of dry Pluronic L64 (40% ethylene oxide) is added 3.6 ml. of Nacconate 80, and the mixture is stirred for about two hours at approximately 120° in a closed system except for a capillary. 10 ml. more of Nacconate 80 is added, and the mixture is allowed to cool to room temperature to form the prepolymer. 33 mg. of silicone oil is added with stirring to 20 g. of the prepolymer and then 0.716 ml. of the catalyst mixture described in Example VI is added, and the entire mixture is stirred producing the foam. The foam is allowed to stand at room temperature for one hour and is then cured by drying at 70° C. for twenty-four hours.

The foam is iodinated in the same manner as that specified in Example I.

*Example VIII*

50 g. of Ethomid HT/60 and 6.4 g. of Nacconate 200 are stirred at 110° C. for an hour. Nacconate 200 is 3,3'-bitolylene-4,4'-di-isocyanate, a crystalling solid melting at about 70° C. An additional 22 g. of Nacconate 200 is added, the mixture cooled to about 70° C. and then 8 ml. of dimethyl formamide and 8 ml. Ethomid HT/60 are added to form the prepolymer. With 25 g. of the prepolymer is intimately admixed 0.66 ml. of 5% Ethomid HT/60 in water.

After curing the foam by drying overnight at 70° C., it is iodinated in the same manner as specified in Example I.

*Example IX*

350 g. of Ethomid HT/60 and 44.8 g. of Nacconate 200 are stirred at 110° C. for an hour, cooled to 60° C. and there is then added 84 ml. Nacconate 80, 56 ml. dimethyl formamide and 56 ml. Ethomid HT/60 to form the prepolymer. With 500 g. of the prepolymer is intimately admixed 13.4 ml. 5% HT/60 in water.

After curing the foam by drying overnight at 70° C., it is iodinated in the same manner specified in Example I.

We have also discovered that the tear resistance of the foams and films is substantially increased by the addition of diols (dihydroxy alcohols) such as 1,4-butanediol, polyoxypropylene glycol (M.W. 425), alone or mixed, to the reaction mixture in the formation of the prepolymer.

The following are non-limitative examples of iodinated foams made with diols that have been added to the surfactant:

*Example X*

160 g. Ethomid HT/60, 24 ml. Niax Diol 425 (M.W. 425) polyoxypropylene glycol made by Union Carbide, Inc. and 20.8 ml. Nacconate 80 are stirred for about 1½ hours at 110° C. Then 48 ml. more of Nacconate 80 are added, and the reaction mixture cooled to 60° C. 32 ml. dimethyl formamide and 32 ml. Ethomid HT/60 are added to form the prepolymer. 1.12 ml. $H_2O$ is intimately and quickly mixed with 45 g. of the prepolymer to form the foam which is placed in a 70° C. oven and allowed to cure at least twenty-four hours.

The foam is iodinated in the same manner as that specified in Example I.

*Example XI*

90 g. Ethomid HT/60, 5.5 g. 1,4-butanediol and 15 ml. Nacconate 80 are stirred for about one hour at 110° C. Then 24 ml. more of Nacconate 80 are added and the reaction mixture cooled to 60° C. 16 ml. dimethyl formamide and 16 ml. Ethomid HT/60 are added to form the prepolymer. 1.12 ml. $H_2O$ is intimately and quickly mixed with 45 g. of the prepolymer to form the foam which is placed in a 70° C. oven and allowed to cure at least twenty-four hours.

The foam is iodinated in the same manner as that specified in Example I.

*Example XII*

160 g. of Ethomid HT/60, 24 ml. Niax Diol 425, 6.0 ml. 1,4-butanediol and 29.6 ml. Nacconate 80 are stirred for about one hour at 110° C. 48 ml. more of Nacconate 80 are added and the reaction mixture cooled to 60° C. 32 ml. dimethyl formamide and 32 ml. Ethomid HT/60 are added to form the prepolymer. 1.12 ml. $H_2O$ is intimately and quickly mixed with 45 g. of the prepolymer to form the foam which is placed in a 70° C. oven and allowed to cure at least twenty-four hours.

The foam is iodinated in the same manner as that specified in Example I.

*Example XIII*

20 g. Ethomid HT/60, 24 ml. Niax Diol 425 and 10.7 ml. Nacconate 80 are stirred for about one hour at 110° C. Then 13 ml. more of Nacconate 80 are added and the reaction mixture cooled to 60° C. 4 ml. dimethyl formamide and 4 ml. Ethomid HT/60 are added to form the prepolymer. 0.63 ml. $H_2O$ is intimately and quickly mixed with 25 g. of the prepolymer to form the foam which is placed in a 70° C. oven and allowed to cure at least twenty-four hours.

The foam is iodinated in the same manner as that specified in Example I.

*Example XIV*

100 g. Pluronic L–61 (10% ethylene oxide by weight) and 9.1 g. Nacconate 80 are mixed and after 1¾ hours at 120° C. with stirring 21.4 g. additional Nacconate 80 is added in about 5 minutes to form a prepolymer. To 10 g. of the prepolymer 33 mg. silicone oil, SF–96 (100), General Electric, are added and then 380 mg. of the catalyst mixture is added comprising 10 parts N-methyl morpholine, 2 parts triethylamine, 3 parts Pluronic L–62 and 28 parts $H_2O$. The mixture is stirred thoroughly for 30 secs., allowed to stand for 1 hour at room temperature and cured for 16 hours at 70° C.

The sponge is iodinated by squeezing in a 0.5% iodine solution made by mixing equal volumes of 1% iodine in methyl alcohol and water.

*Example XV*

The prepolymer of the foregoing Example XIV is taken up in benzene or ethylene dichloride, poured onto a dry polyethylene plate and cured at room temperature for about 72 hours after which it is iodinated by exposure to iodine vapors, preferably in a 58° C. oven for approximately 20–30 minutes.

In making the iodinated films, the prepolymers mentioned in the Examples above are dissolved in a non-reactive, dry organic solvent, such as benzene, and poured onto a dry polyethylene plate. After drying the film at room temperature for about 72 hours, a cured tough film is formed which is then iodinated by exposure to iodine vapors, preferably in a 58° C. oven for approximately 20–30 minutes.

We claim:

1. An antiseptic foam comprising a polyurethane foam made by reacting a member of the group consisting of polyesters containing terminal hydroxy groups, polyethers containing terminal hydroxy groups and surfactants containing terminal hydroxy groups with an organic di-isocyanate, said polyurethane foam being complexed with iodine and being capable of slowly releasing equilibrium amounts of iodine in water.

2. An antiseptic film comprising a polyurethane film made by reacting a member of the group consisting of polyesters containing terminal hydroxy groups, polyethers containing terminal hydroxy groups and surfactants containing terminal hydroxy groups with an organic di-isocyanate, said polyurethane film being complexed with iodine and being capable of slowly releasing equilibrium amounts of iodine when exposed to water vapor.

3. An antiseptic foam comprising iodine complexed with a polyurethane foam, said polyurethane foam being prepared by reacting an organic di-isocyanate with a substantially equivalent amount of a surfactant containing a hydrophilic portion composed of at least two chains of ethylene oxide, each chain terminating in a free hydroxyl group, and then adding an excess of di-isocynate and water with a basic catalyst, the final product having an ethylene oxide content of 30 to 80% by weight.

4. An antiseptic film comprising iodine complexed with a polyurethane film, said polyurethane film being prepared by reacting an organic di-isocyanate with a substantially equivalent amount of a surfactant containing a hydrophilic portion composed of at least two chains of ethylene oxide, each chain terminating in a free hydroxyl group, and then adding an excess of di-isocyanate and a basic catalyst, dissolving the product in a non-reactive organic solvent, pouring the solution on a dry plate and allowing the same to cure, the resultant film having an ethylene oxide content of 30 to 80% by weight.

5. An antiseptic foam comprising iodine complexed with a polyurethane foam, said polyurethane foam being prepared by reacting an organic di-isocyanate with a substantially equivalent amount of a surfactant containing a hydrophobic portion and a hydrophilic portion, said hydrophilic portion being composed of at least two chains of ethylene oxide, each chain terminating in a free hydroxyl group, and then adding an excess of di-isocyanate, a basic catalyst and water, and finally curing the foam, the foam having an ethylene oxide content of 30 to 80% by weight.

6. An antiseptic foam comprising iodine complexed with a foam made by reacting a surfactant produced by reacting fatty acid amides having 12 to 18 carbon atoms with ethylene oxide, said surfactant having at least two free terminal hydroxyl groups and about 5 to 100 moles ethylene oxide per mole of fatty acid amide, with a substantially equivalent amount of mixtures of 2,4 and 2,6-tolylene di-isocyanates to which a basic catalyst has been added, then adding an excess of the di-isocyanate and water and finally curing the foam, the foam having an ethylene oxide content of 30 to 80% by weight.

7. The foam of claim 6 in which the catalyst is dimethyl formamide.

8. The foam of claim 6 wherein a quaternary ammonium halide is added to the unreacted surfactant, said quaternary ammonium halide being formed from the reaction of a methyl halide with a tertiary amine having the formula:

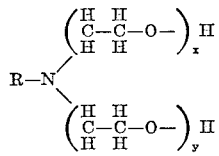

wherein R=a fatty acid alkyl of $C_{12}$ to $C_{18}$ and $x+y=$ about 5 to 100.

9. An antiseptic detergent foam comprising iodine complexed with a foam made by reacting a surfactant produced by reacting fatty acid amides having 12 to 18 carbon atoms and ethylene oxide, which surfactant contains at least two free terminal hydroxyl groups and 50 moles ethylene oxide per mole of fatty acid amide, with an equivalent amount of a mixture containing about 65 to 80% of the 2,4 isomer and about 20 to 35% of the 2,6 isomer of tolylene di-isocyanate, then adding an excess of the di-isocyanate followed by the addition of dimethyl formamide plus an additional quantity of the original surfactant less than that required to react completely with the excess of di-isocyanate and water for foaming and finally curing the foam.

10. An antiseptic detergent foam comprising iodine complexed with a foam made by reacting a surfactant containing at least two free terminal hydroxyl groups and prepared by condensing 40 to 80% ethylene oxide with a hydrophobic base of M.W. 1500–1800, said base being the condensation product of propylene oxide and propylene glycol, with a substantially equivalent amount of an organic di-isocyanate, then adding an excess of di-isocyanate and water to which a basic catalyst has been added and finally curing the foam.

11. An antiseptic detergent foam comprising iodine complexed with a foam made by reacting a surfactant containing at least two free terminal hydroxyl groups and produced by reacting fatty acid amides having 12 to 18 carbon atoms with ethylene oxide, said surfactant containing 50 moles ethylene oxide per mole of fatty acid amide, with an equivalent amount of 3,3'-bitolylene-4,4' di-isocyanate, then adding an excess of the di-isocyanate followed by the addition of dimethyl formamide plus an additional amount of the original surfactant less than that required to react completely with the excess di-isocyanate and finally admixing with water and curing.

12. An antiseptic foam comprising iodine complexed with a polyurethane foam, said polyurethane foam being prepared by reacting an organic di-isocyanate with a substantially equivalent amount of a surfactant containing a hydrophilic portion composed of at least two chains of ethylene oxide, each chain terminating in a free hydroxyl group, to which has been added a minor amount of a dihydroxy alcohol for the purpose of improving tear resistance, and then adding an excess of di-isocyanate and water with a basic catalyst, the final product having an ethylene oxide content of 30 to 80% by weight.

13. The product of claim 12 wherein said surfactant additionally contains a hydrophobic portion.

14. An antiseptic film comprising iodine complexed with a film made by reacting an organic di-isocyanate with a substantially equivalent amount of a surfactant containing a hydrophobic portion and a hydrophilic portion, the hydrophilic portion being composed of at least two chains of ethylene oxide, each chain terminating in a free hydroxyl group, to which has been added a minor amount of a dihydroxy alcohol for the purpose of increasing tear resistance, then adding an excess of di-isocyanate and a basic catalyst, dissolving the product in a non-reactive organic solvent, pouring the solution on a dry plate and allowing the same to cure, the resultant film having an ethylene oxide content of 30 to 80% by weight.

15. An antiseptic detergent foam comprising iodine complexed with a foam made by reacting a surfactant produced by reacting fatty acid amides having 12 to 18 carbon atoms and ethylene oxide, which surfactant contains at least two free terminal hydroxyl groups and 50 moles ethylene oxide per mole of fatty acid amide, with an equivalent amount of a mixture containing about 65 to 80% of the 2,4 isomer and about 20 to 35% of the 2,6 isomer of tolylene di-isocyanate followed by the addition of dimethyl formamide, an excess of the di-isocyanate and water and finally curing the foam.

16. An antiseptic film comprising iodine complexed with a polyurethane film made by reacting an organic di-isocyanate with a substantially equivalent amount of a surfactant containing a hydrophilic portion composed of at least two chains of ethylene oxide, each chain terminating in a free hydroxyl group, then adding an excess of di-isocyanate and a basic catalyst, dissolving the product in a non-reactive organic solvent, pouring the solution on a dry plate and allowing the same to cure, the resulting film having an ethylene oxide content of 30 to 80% by weight.

17. An antiseptic detergent film comprising iodine complexed with a film made by reacting a surfactant produced by reacting fatty acid amides having 12 to 18 carbon atoms and ethylene oxide having at least two free hydroxy groups, which surfactant contains 50 moles ethylene oxide per mole of fatty acid amide, with an equivalent amount of a mixture containing about 65 to 80% of the 2,4 isomer and about 20 to 35% of the 2,6 isomer of tolylene di-isocyanate, adding an additional quantity of the original surfactant, then adding an amount of the di-isocyanate in the excess of that required to react completely with the additional quantity of surfactant, dissolving the product in a non-reactive organic solvent, adding a basic catalyst, pouring the solution on a dry surface and allowing the same to cure, the film thus having an ethylene oxide content of 30 to 80% by weight.

18. An antiseptic foam comprising iodine complexed with a polyurethane foam, said polyurethane foam being formed by reacting an organic di-isocyanate with a surfactant containing a hydrophobic portion and a hydrophilic portion, the hydrophilic portion being composed of at least two chains of ethylene oxide, each chain terminating in a free hydroxyl group, the final product having an ethylene oxide content of 30 to 80% by weight, immersing the resulting polyurethane foam in an aqueous-alcoholic solution of iodine and then drying the foam, said antiseptic foam being capable of slowly releasing equilibrium amounts of iodine and surfactant in water.

19. An antiseptic film comprising iodine complexed with a polyurethane film, said polyurethane film being formed by reacting an organic di-isocyanate with a surfactant containing a hydrophobic portion and a hydrophilic portion, the hydrophilic portion being composed of at least two chains of ethylene oxide, each chain terminating in a free hydroxyl group, the final product having an ethylene oxide content of 30 to 80% by weight, and then exposing the resultant polyurethane film to iodine vapors, said antiseptic film being capable of slowly releasing equilibrium amounts of iodine and surfactant when the film is exposed to water vapor.

20. An antiseptic film comprising iodine complexed with a polyurethane film, said polyurethane film being formed by reacting an organic di-isocyanate with a surfactant containing a hydrophobic portion and a hydrophilic portion, the hydrophilic portion being composed of at least two chains of ethylene oxide, each chain terminating in a free hydroxyl group, and then exposing the resultant polyurethane film to iodine vapors, said antiseptic film being capable of slowly releasing equilibrium amounts of iodine and surfactant when the film is exposed to water vapor.

21. An antiseptic foam comprising iodine complexed with a polyurethane foam, said polyurethane foam being formed by reacting an organic di-isocyanate with a surfactant containing a hydrophobic portion and a hydrophilic portion, the hydrophilic portion being composed of at least two chains of ethylene oxide, each chain terminating in a free hydroxyl group, immersing the resultant polyurethane foam in a solution of iodine and then drying the foam, said iodinated foam being capable of slowly releasing equilibrium amounts of iodine and surfactant in water.

References Cited by the Examiner

UNITED STATES PATENTS

| | | | |
|---|---|---|---|
| 1,221,231 | 4/1917 | Sharp | 167—70 |
| 2,977,315 | 3/1961 | Scheib | 167—70 |
| 3,024,207 | 3/1962 | Shaw | 260—2.5 |

JULIAN S. LEVITT, *Primary Examiner.*

M. O. WOLK, LEWIS GOTTS, *Examiners.*